United States Patent
Yamanishi (10) Patent No.: US 6,204,931 B1
(45) Date of Patent: Mar. 20, 2001

(54) IMAGE FORMING APPARATUS AND AN IMAGE FORMING METHOD THEREOF

(75) Inventor: Eiichi Yamanishi, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/065,413

(22) Filed: Apr. 24, 1998

(30) Foreign Application Priority Data

Apr. 30, 1997 (JP) .................................................... 9-112828

(51) Int. Cl.$^7$ .............................. G06K 15/14; H04N 1/29; H04N 1/407
(52) U.S. Cl. .............................. 358/1.9; 358/1.7; 358/455
(58) Field of Search ..................................... 382/173, 176, 382/256, 257, 258, 259, 276, 275, 199, 190, 192, 194; 358/505, 506, 518, 519, 521, 523, 528, 534, 537, 538, 474, 298, 300, 1.9, 1.7, 455

(56) References Cited

U.S. PATENT DOCUMENTS

| 5,920,646 | * | 7/1999 | Kamon .................................. 382/173 |
| 6,011,635 | * | 1/2000 | Bungo et al. ......................... 358/488 |

FOREIGN PATENT DOCUMENTS

| 0 458 308 | 11/1991 | (EP) . |
| 0 493 962 | 7/1992 | (EP) . |
| 58-34675 | 3/1983 | (JP) . |
| 58-107344 | 6/1983 | (JP) . |
| 5-75816 | 3/1993 | (JP) . |
| 89/04575 | 5/1989 | (WO) . |

* cited by examiner

Primary Examiner—Scott Rogers
(74) Attorney, Agent, or Firm—Foley & Lardner (57) ABSTRACT

An image processing apparatus has a first correction circuit for recognizing and erasing a predetermined number of pixels of an image from an end portion of the image in the main scanning direction, and a second correction circuit for recognizing and erasing a predetermined number of pixels of the image in the sub-scanning direction.

20 Claims, 8 Drawing Sheets

IMAGE FORMING APPARATUS AND AN IMAGE FORMING METHOD THEREOF

BACKGROUND OF THE INVENTION

The present invention relates to an image processing apparatus and an image forming apparatus, which function to store image data obtained by reading an image, into a memory, and which forming an image on a paper sheet by subjecting the image data to image processing.

There has been a conventional image forming apparatus in which scanning using a laser beam is carried out by a polygon motor and the laser beam is irradiated onto a photosensitive material thereby forming an electrostatic latent image, which is visualized by a developing step and is transferred as an image onto a recording medium by a fixing means. This technique is frequently used in laser printers, plain paper copiers (PPC) in recent years.

It is necessary that pixels have respectively desired sizes in case where an electrostatic latent image is formed by switching on or off the laser for every pixel and is visualized by fine toner.

For example, to express an image at 400 dpi, a pixel requires a size of a square of 63.5 $\mu$m. This size of pixel is obtained by convergence by a lens optical system not shown.

Even if the laser beam is converged to a desired size, the size of pixel may be enlarged if fixing is performed by a heat or pressure since toner is three-dimensionally applied on a photosensitive member in developing and fixing steps.

Thus, various technical problems exist as for one-pixel system and various proposals have been made as for the one-pixel system.

For example, Japanese Patent Application KOKAI Publication 58-34675 discloses that a laser beam needs to be shaped elliptically in a sub-scanning direction with respect to a desired size and one or two pixels in the sub-scanning direction are changed to correct this. Japanese Patent Application KOKAI Publication 58-107344 discloses a method of shortening a laser exposure period in the laser scanning direction to prevent pixels from being collapsed during fixing. Further, Japanese Patent Application KOKAI Publication 5-75816 discloses a method of making a correction by binarization based on power modulation from observation of two or more pixels prior to and subsequent to a target pixel.

Although various measures for correcting deterioration of image quality due to collapse of pixels have been introduced, all of the measures are one-dimensional correction measures and therefore cannot yet provide sufficient effects in response to deterioration of image quality due to collapse of characters.

Balance of an image in the longitudinal and lateral directions may be lost with correction in only the main scanning direction or sub-scanning direction.

Further, correction to pixels is advantageous for deterioration of image quality due to collapse of pixels in a character area, but leads to a problem of deterioration in tone of an image particularly in one-dimensional correction if the correction is made to a photographic image or an half-tone image since correction to pixels is effected on the entire image.

Although correction to a binary image advantageously requires a small circuit scale, advantageous measures have not been achieved to deal with multi-bit data.

As has been described above, various measures for correcting deterioration of image quality due to collapse of pixels during forming an image. However, all of the measures are one-dimensional and any of them cannot make sufficient effects on deterioration of image quality due to collapse of characters. With correction only in a main scanning direction or a sub-scanning direction, balance of an image in longitudinal and lateral directions may be broken.

Further, since the correction is effected on pixels of the entire image, advantages are obtained with respect to deterioration of image quality due to collapse of a character area. There is a problem that the tone of an image is deteriorated particularly in one-dimensional correction.

Another problem occurs in that correction to a binary image requires a circuit of a small scale but no effective measures are found to deal with multi-bit data.

BRIEF SUMMARY OF THE INVENTION

The present invention has an object of providing an image processing apparatus and an image forming apparatus which are capable of preventing deterioration of tone of an image without spoiling balance of the image and are capable of processing an image by making excellent correction with respect to dealing of multi-bit data.

According to the present invention, there is provided an image processing apparatus comprising: first correction means for recognizing and erasing a predetermined first number of pixels of the image from an end portion of the image in a first direction; and second correction means for recognizing and erasing a predetermined second number of pixels of the image remaining after the erasing by the first correction means, in a second direction perpendicular to the first direction.

An image forming apparatus according to the present invention corrects an image both in the main scanning direction and the sub-scanning direction by the structure as described above. Therefore, correction can be made without deterioration of tone of an image and without spoiling balance of the image.

In an image processing method according to the present invention, well-balanced correction processing can be performed on the same grounds as the above.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

In the following, an embodiment of the present invention will be explained with reference to the drawings.

Figure 1:
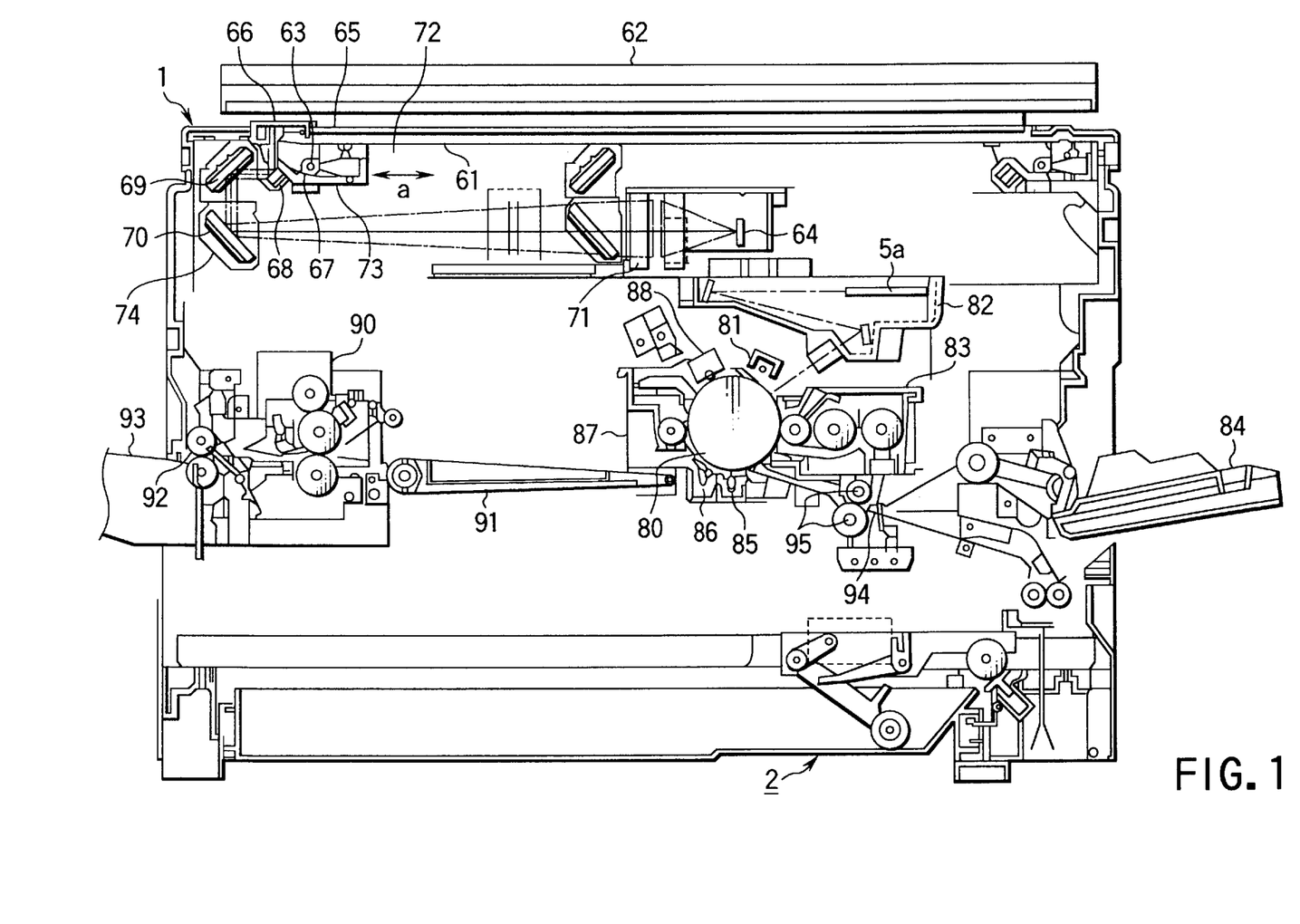
FIG. 1 is a cross-sectional view showing a schematic structure of a digital copying apparatus according to an image forming apparatus of the present invention.

FIG. 1 shows a schematic structure of a digital copying apparatus as an example of an image forming apparatus according to the present invention. The present digital copying apparatus is roughly comprised of a scanner section 1 as a read means for optically reading image information from an original document, and a printer section 2 as an image forming means for forming an image on a paper sheet (or medium) by an electrophotographic system in accordance with an image signal read out by the scanner section 1 or an external device not shown.

The scanner section 1 includes a document table 61 where an original document to be copied is set, an platen cover 62 for pressing an original document mounted on the document table 61, which can be opened/closed, a fluorescent lamp 63 as a light source for illuminating an original document set on the table 61, a CCD type line sensor 64 as a photoelectric means for photoelectrically converting reflection light from an original document by light irradiation from the fluorescent lamp 63. The fluorescent lamp 63 is provided with a lamp heater not shown as a heating means for heating the tube wall of the lamp to a constant temperature. In addition, the document table 61 is provided with a platen glass 65 for mounting an original document, and a document scale for measuring the document position by fitting an original document thereto.

In a side of the lamp 63, there is provided a reflector 67 for efficiently converging light from the fluorescent lamp 63 to an original document. Between the fluorescent lamp 64 and the line sensor 64, there are provided a plurality of mirrors 68, 69, and 70 for bending light from an original document to the line sensor 64, i.e., for bending the light path which reflection light from an original document passes, as well as a lens unit 71 for converging the reflection light to a light receiving surface of the line sensor 64.

Further, a scanning system consisting of the fluorescent lamp 63 and the mirrors 68 to 70 is reciprocally moved in the arrow direction a along the lower surface of the document table 61, thereby performing exposure and scanning of an original document set on the document table 61. In this case, the mirrors 69 and 70 are moved at an half of the speed of the mirror 68 so as to maintain the length of the light path.

Reflection light from the document table by the scanning by the scanning system, i.e., reflection light from an original document by light illumination of the fluorescent lamp 63 is further reflected by the mirrors 68 to 70. The reflection light thereafter passes through the lens unit 71 and is introduced by the line sensor 64, to be converged onto a light receive surface of the line sensor 64.

The scanning unit 72 consists of the fluorescent lamp 63, line sensor 64, mirrors 64 to 70, and lens unit 71. The fluorescent lamp 63, the reflectors 67, and the mirror 68 are provided on a first carriage 73, and the mirrors 69 and 70 are provided on a second carriage 74. Each of the carriage 73 and 74 is moved by a motor not shown.

The printer section 2 is arranged to be rotatable in a desired direction by a motor not shown. The printer section is charged to a desired potential and has a photosensitive drum 80 as an image carrier where an electrostatic latent image is formed by irradiating a beam modulated in accordance with print data.

Around the photosensitive drum 80, there are sequentially provided a charger 81 for charging the surface of the photosensitive drum 8, a laser unit 82 having a semiconductor laser 5a for outputting a beam as a laser beam modulated in accordance with print data as image information to be copied or outputted, onto the surface of the photosensitive drum 80, a developing device 83 for developing an electrostatic latent image formed on the photosensitive drum 80 by the beam from the laser unit 82 by applying toner to the electrostatic latent image, a transfer device 85 for transferring the developed toner image on the photosensitive drum 80 onto a paper sheet suctioned onto the photosensitive drum 80, and a peel device 86 for peeling the paper sheet suctioned on the photosensitive drum 80.

A cleaner unit 87 for removing toner remaining on the surface of the photosensitive drum 80 and an erasure device 88 for erasing the potential on the photosensitive drum 80 for formation of a next image are sequentially provided around the photosensitive drum 80 in the downstream side of the peel device 86.

From paper sheets to be supplied from the paper supply section 84, one sheet is separated and supplied. Supply of paper sheets is temporarily stopped after a predetermined time period from the time when the paper sheet is detected by a paper stop switch 94. The predetermined time period is the time period elapsed until the paper sheet supplied collides into and is aligned with a nip portion of a pair of aligning rollers 95.

Thereafter, a printer CPU 14 outputs an interruption signal in synchronization with an image formed on the photosensitive drum 80, and then, a pair of aligning rollers 95 rotate again thereby feeding a paper sheet between the photosensitive drum 80 and a transfer device 85. A toner image formed on the photosensitive drum 80 is then transferred onto a predetermined position of the paper sheet.

A fixing device 90 and a transport device 91 for transporting the paper sheet peeled by the peel device 86 toward the fixing device 90 are provided in a rear stage of the peel device 86 in the direction in which the paper sheet with the transferred toner image is peeled from the photosensitive drum 80 by the peel device 86.

The paper sheet on which the toner image is fixed is fed out onto a feed-out tray 93.

Figure 2:
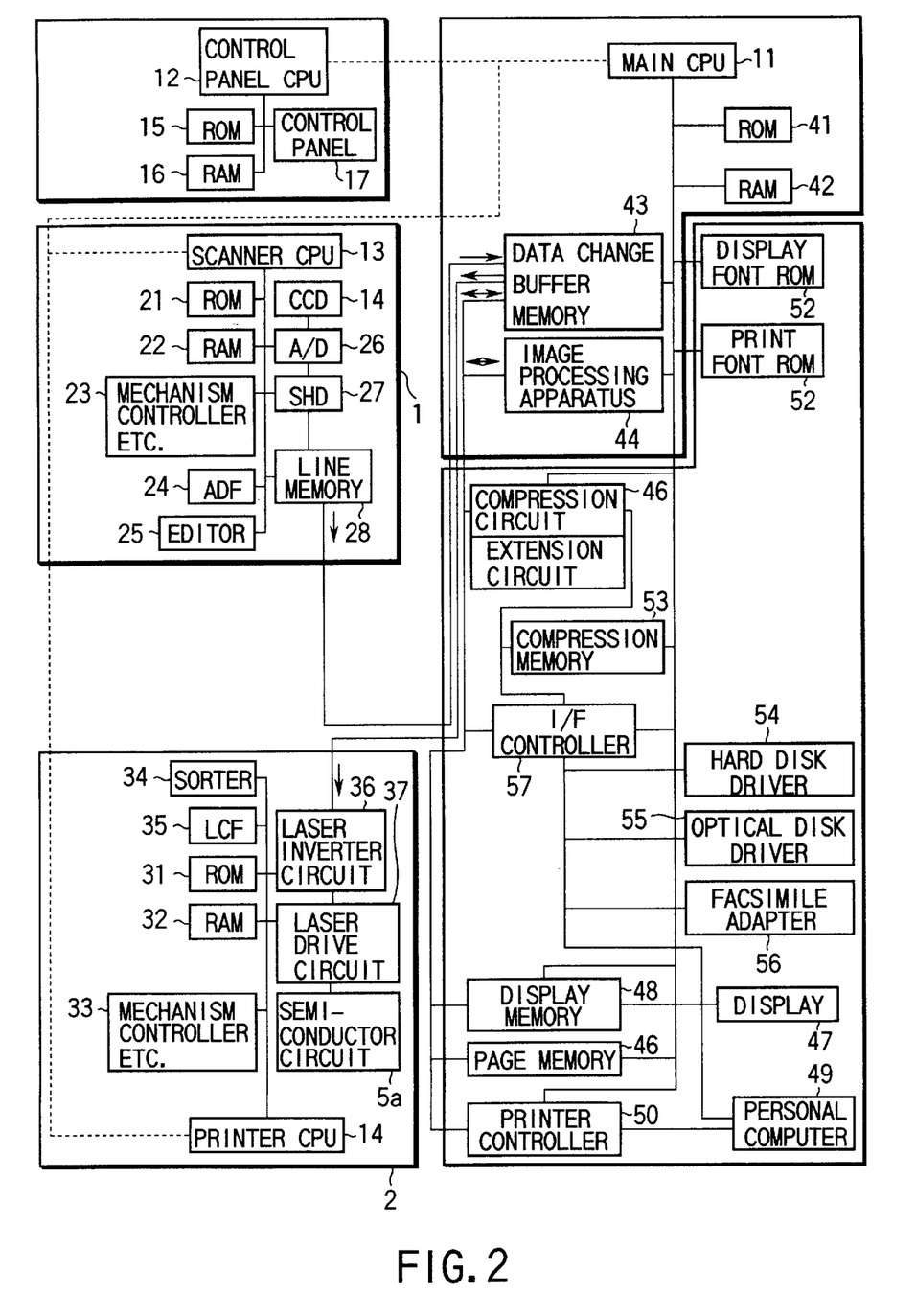
FIG. 2 is a block diagram showing a schematic structure of an image processing apparatus according to a first embodiment.

FIG. 2 shows the schematic structure of a control system of the digital copying apparatus described above. The present apparatus is controlled by a main CPU 11, a control panel CPU 12, a scanner CPU 13, and a printer CPU 14.

The main CPU 11 communicates with and controls the control panel CPU 12, the scanner CPU 13, and the printer CPU 14.

The control panel CPU 12 is connected to a ROM 15 and a RAM 16 and executes detection of a switch on the control panel 17, turning on/off of LEDs, and control of a display device, based on data from the ROM and RAM.

The scanner CPU 13 is controlled through communication with the main CPU 11 and control s a CCD-type line sensor 14, a motor not shown, a mechanical controller 23 of solenoids and the like, an automatic document feeder 24, an editor 25 as a coordinate input device, an analog/digital converter 26 as a conversion means, a shading correction circuit 27, a line memory 28, and the like, based on data from the ROM 21 and RAM 22.

The printer CPU 14 is controlled through communication with the main CPU 11 and controls a motor not shown, a mechanical controller 33 of solenoids and the like, a sorter 34, a LCF (Large Capacity Feeder) 35, a laser modulation circuit 36, a laser drive circuit 37, and the like.

The main CPU 11 is connected to a ROM 41, a RAM 42, a data change buffer memory 43, an image processing apparatus 44, a compression/extension circuit 45, a page memory circuit 46, a display 47, a display memory 48, a personal computer (which will be hereinafter denoted as PC) 49, a printer controller 50, a display font ROM 51, a print font ROM 52, a compression memory 53, a hard disk drive 54, an optical disk drive 55, a facsimile adapter 56, and an I/F controller 57.

The ROM 41 stores a program of predetermined operation relating to the main CPU 1.

The RAM 42 stores data defined by the ROM 41 and the main CPU 1.

The data change buffer memory 43 switches destinations of image data read by the scanner section 1 and data to be sent to the printer section 2, and also buffers data.

The image processing apparatus 44 performs predetermined image processing on image data.

The compression/extension circuit 45 performs compression/extension of image data.

The page memory circuit 46 as a memory means stores image data for every page.

The display memory 48 stores image data to be displayed onto the display 47.

The printer controller 50 develops code data supplied from the PC 49 into image data which can be printed out (or outputted), through the printer section 2.

The display font ROM 51 is a memory which stores font data to be used by the display memory 48.

The print font ROM 52 makes the page memory 46 store a number or symbol corresponding to print data and a desired input from the PC 49.

The compression memory 53 stores data compressed by the compression/extension circuit 45.

Next, the image processing apparatus 44 in the structure as described above will be explained.

Figure 3:
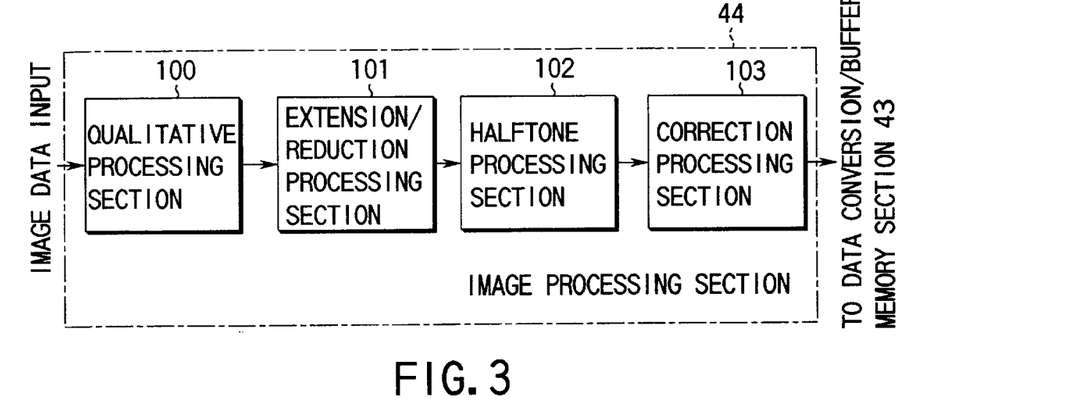
FIG. 3 shows a structure of an image processing apparatus according to a first embodiment.

FIG. 3 shows the structure of the image processing apparatus 44 in the first embodiment of the present invention. The image processing apparatus 44 according to the first embodiment is constructed by providing a correction processing section 103 after a qualitative processing section 100, an extension/reduction section 101, and a halftone processing section 102. Inputted image data is sent to the qualitative processing section 100 and is processed. Thereafter, the image data is sent to the extension/reduction section 101 and is subjected to extension/reduction processing. The image data is then outputted. The output is sent to the halftone processing section 102 and desired gradation processing is performed. The output is further corrected by the correction processing section 103 and is outputted as print data to the data conversion/buffer memory 43. Thus, the processing result can be subjected to a correction of a smaller number of data items such as binary data, so that the circuit scale can be reduced and a desired result can be obtained.

Figure 4:
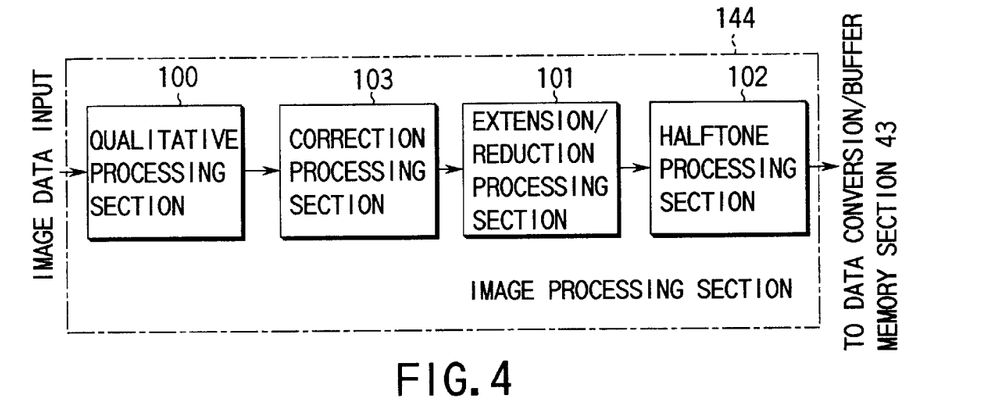
FIG. 4 shows a structure of an image processing apparatus according to a second embodiment.

FIG. 4 shows the structure of the image processing apparatus 144 according to a second embodiment of the present invention.

In the image processing apparatus according to the second embodiment, a correction processing section 103 is provided after a qualitative processing section 100, and also an extension/reduction section 101 and an halftone processing section 102 are also included. Inputted image data is sent to the qualitative processing section 100 and is subjected to processing. The image data is thereafter corrected by the correction processing section 103 and is sent to the extension/reduction section 101 where extension/reduction processing is carried out. The data is then outputted. The output is sent to the halftone processing section 102 and is subjected to desired gradation processing. The output therefrom is outputted as print data to the data conversion/buffer memory 43. Although the circuit scale of this embodiment may thus be larger than that of the first embodiment, it is possible to reduce influences on processing results from the halftone processing in intermediate processing since processing in a multi-bit stage is carried out.

Figure 5:
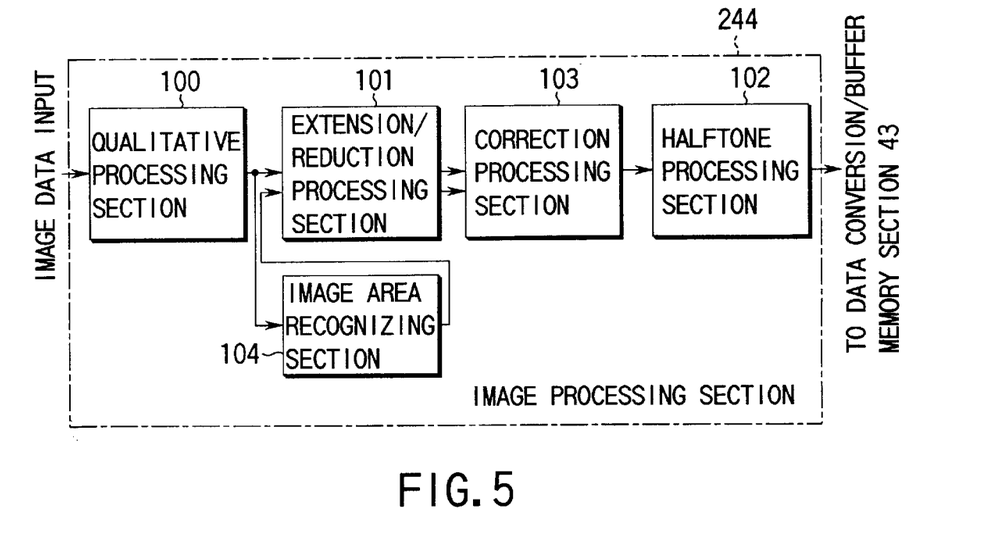
FIG. 5 shows a structure of an image processing apparatus according to a third embodiment.

FIG. 5 shows the structure of the image processing apparatus 244 according to a third embodiment of the present invention. The third embodiment is only different from the first embodiment in the structure of the image processing apparatus 44, and therefore, explanation of the rest of the structure will be omitted herefrom.

The image processing apparatus 244 according to the third embodiment consists of a qualitative processing section 100, an image area recognizing section 104, an extension/reduction processing section 101, a correction processing section 103, an halftone processing section 102. A result from qualitative processing is inputted to the image area recognizing section 104, and an image area recognizing signal thereby obtained is inputted together with image data subjected to qualitative processing, to the extension/reduction processing section 101, and is than inputted to the correction section 103 after extension/reduction processing. In the correction processing section 103, correction processing is performed only on a character area where the problem is cited as to collapse of small characters, but is not performed on an area, e.g., a halftone area where correction processing causes harmful influences. After the correction processing, data is sent to the halftone processing section 102 where desired gradation processing is performed, and is then outputted as print data to the data conversion/buffer memory section 43.

Figure 6:
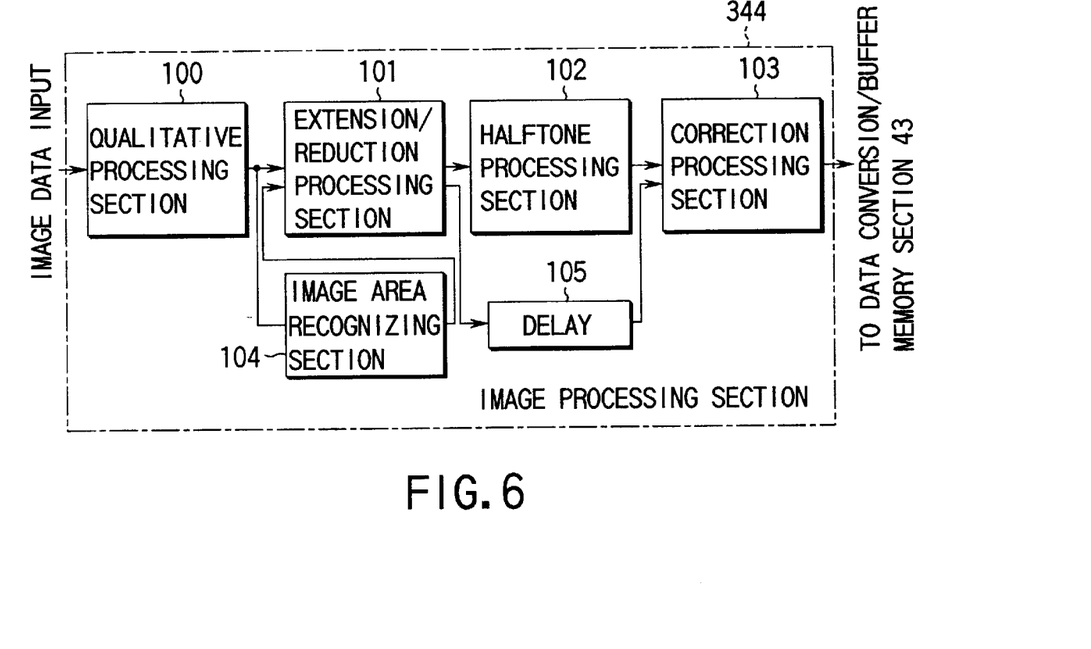
FIG. 6 shows a structure of an image processing apparatus according to a fourth embodiment.

FIG. 6 shows the structure of the image processing apparatus 344 according to a fourth embodiment of the present invention. The fourth embodiment differs from the first embodiment in the structure of the image processing apparatus 44, and therefore, explanation of the rest of the structure will be omitted herefrom.

The image processing apparatus 344 according to the fourth embodiment consists of a qualitative processing section 100, an image area recognizing section 104, an extension/reduction section 101, a delay 105, an halftone processing section 102, and a correction processing section 103. A result from qualitative processing is sent to the image area recognizing section 104, and an image recognizing signal thereby obtained is inputted together with image data, to the extension/reduction processing section 101. After extension/reduction, the signal is inputted to the delay 105 as well as the halftone processing section 102. Thus, in the correction processing section 103, image recognizing data is outputted to the data conversion/buffer memory 43, using the data for correction processing after halftone processing. In this manner, correction processing can be performed on an area of a lower bit, and therefore, the circuit scale can be relatively small.

Figure 7:
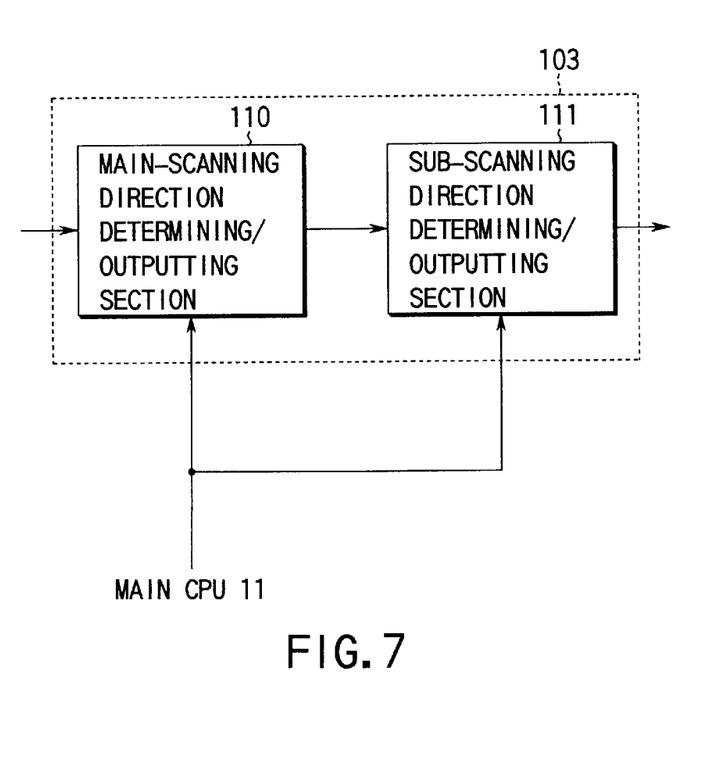
FIG. 7 shows a structure of a correction processing section according to the present invention.

FIG. 7 shows the structure of a correction processing section 103 according to the present invention. The correction processing section 103 is comprised of a main scanning direction determining/outputting section 110 for determining/outputting the main scanning direction, and a sub-scanning direction determining/outputting section 111 for determining/outputting the sub-scanning direction. Both the main scanning direction determining/outputting section 110 and the sub-scanning direction determining/outputting section 111 are connected to the main CPU 11, so that necessary parameters can be set.

Figure 8:
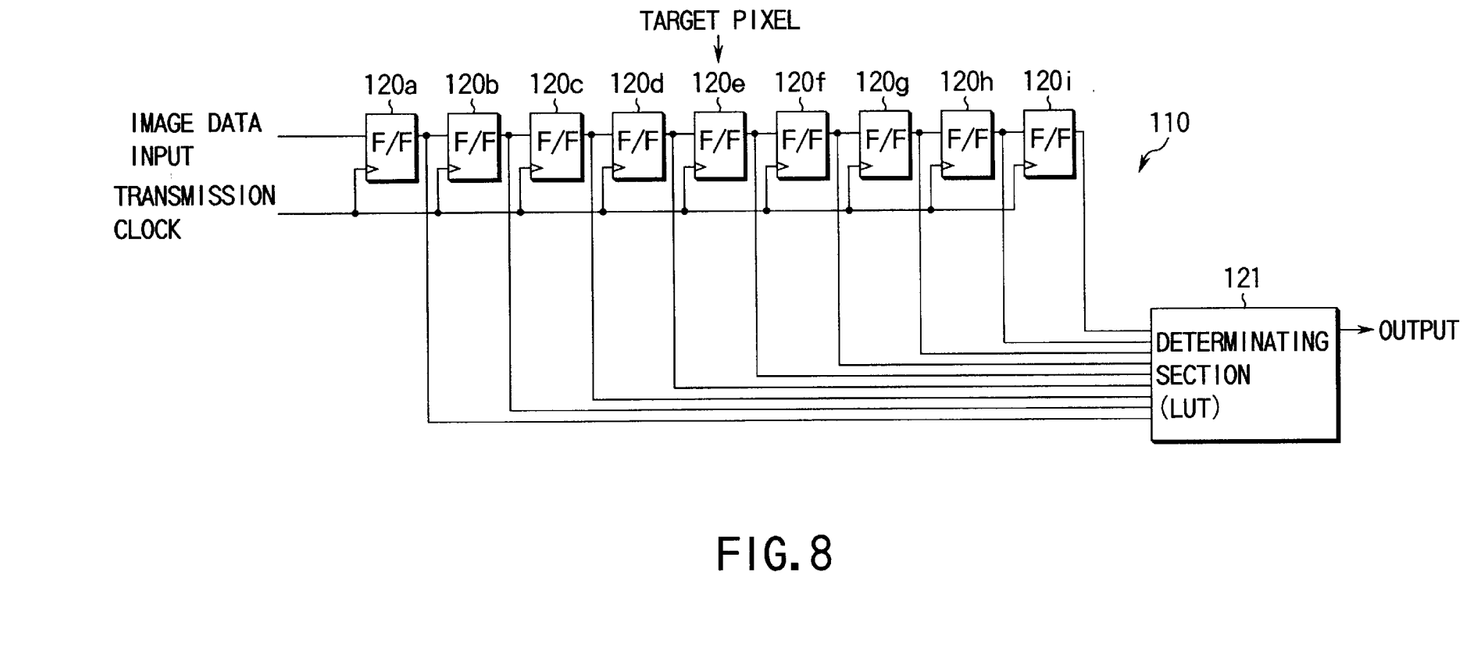
FIG. 8 shows a main scanning direction determining/outputting section according to the present invention.

FIG. 8 shows the main scanning direction determining/outputting section 110 in the present invention. The main scanning direction determining/outputting section 110 is comprised of a plurality of flip-flop circuits 120a to 120i, and a determining section 121. At first, image data is inputted to the flip-flop circuits 120a to 120i connected in series with each other in synchronization with an image transfer clock, and the image data is transferred to next flip-flop circuits (120a to 120i) in accordance with the clock.

Respective outputs of the flip-flop circuits 120a to 120i are inputted to a determining section 121, which outputs determination data in correspondence with inputted data.

The determining section 121 consists of a rewritable LUT (Look-Up Table) and is accessed by the main CPU 11 of the apparatus to which the present invention is applied. The contents of the LUT (or determining section) 121 is can be rewritten so that erasure and density setting of a pixel as a starting point can be set in accordance with the characteristic of the printer section 2. In addition, the main CPU 11 is also connected to the control panel 17 and a user or a service man can change the setting values in the LUT (or determining section) 121 in compliance with the status of the apparatus.

It is possible to utilize the LUT (or determining section) 121 for toner consumption saving by setting through the control panel 17 if data of the LUT (or determining section) 121 is arranged for toner consumption saving mode, for example, by extremely narrowing lines of an image, and if data is also arranged so that information is not lost.

Figure 9:
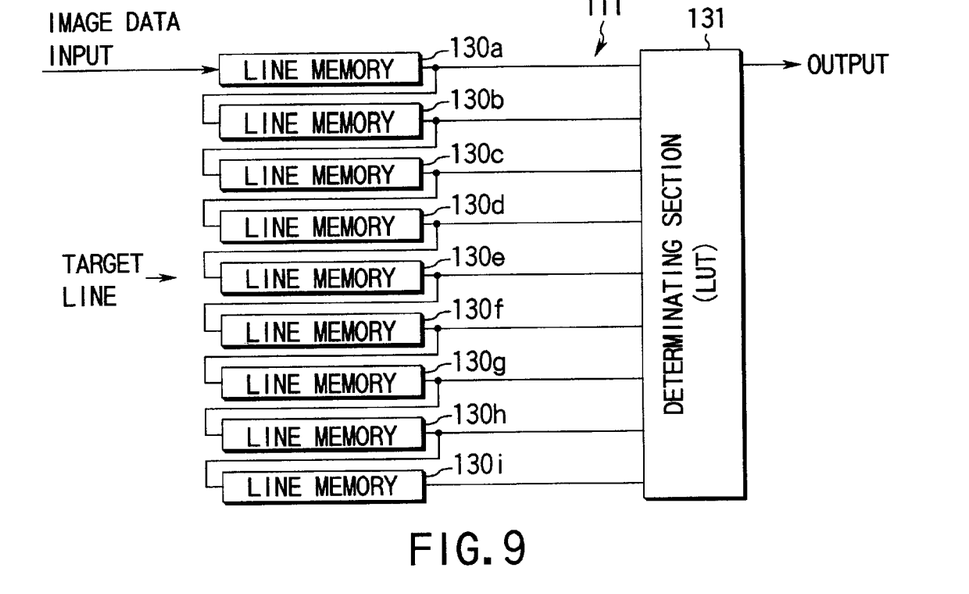
FIG. 9 shows a sub-scanning direction determining/outputting section according to the present invention.

FIG. 9 shows the sub-scanning direction determining/outputting section 111. The sub-scanning direction determining/outputting section 111 is comprised of a plurality of line memories 130a to 130i and a determining section 131 consisting of a LUT.

A plurality of data items each corresponding to a sub-scanning line are respectively stored in the line memories 130a to 130i and are transferred to the determining section 131 in synchronization with a horizontal synchronization signal and a pixel transfer clock. The determining section 131 outputs determination data in correspondence with inputted data.

The determining section 131 consists of a LUT and is rewritable. Like in the explanation to FIG. 8, optimum setting can be made in accordance with the characteristic of the printer section 2.

Figure 10:
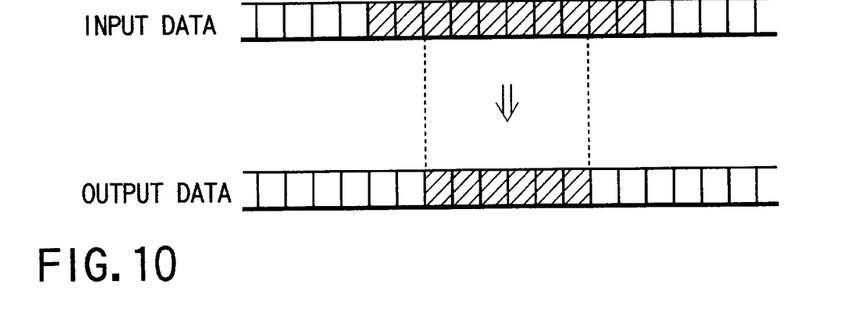
FIG. 10 schematically shows results of the main scanning direction determining/outputting section.

FIG. 10 schematically expresses a result of the main scanning direction determining/outputting section 110, and output data as a processing result indicated by (b) in FIG. 10 is obtained from input data indicated by (a).

Figure 11:
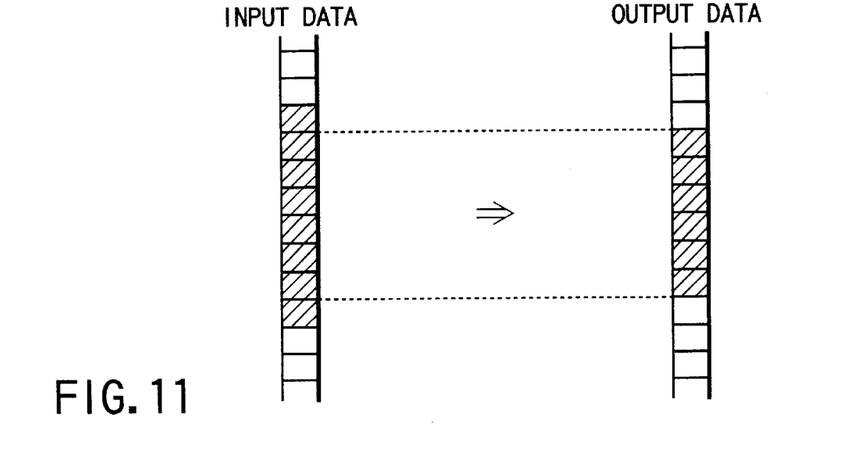
FIG. 11 schematically shows results of the sub-scanning direction determining/outputting section.

FIG. 11 schematically shows a result of the sub-scanning direction determining/outputting section 110, and output data indicated by (b) in this figure is obtained from input data indicated by (a).

Figure 12:
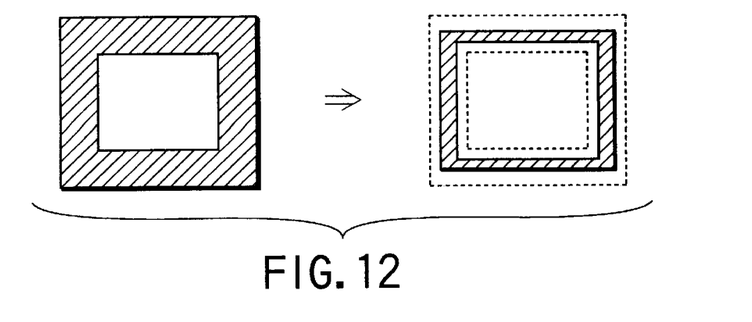
FIG. 12 schematically shows results of the correction processing section.

FIG. 12 schematically shows a result of the correction processing section 44, and output data as a processing result indicated by (b) in this figure is obtained from input data indicated by (a).

Explanation will now be made of values set in the LUT (or determining sections) 121 and 131 provided in the main scanning direction determining/outputting section 110 and the sub-scanning direction determining/outputting section 111, respectively.

Figure 13:
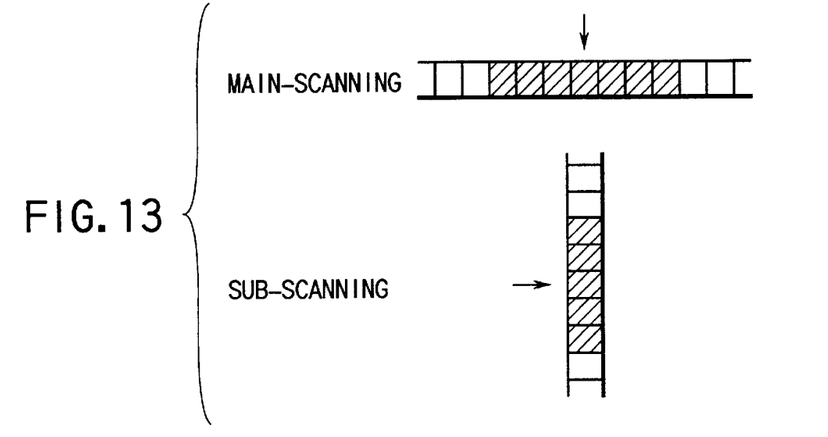
FIG. 13 explains values set in a LUT.

In case where data as indicted by (a) in FIG. 13 is inputted in the main scanning direction, image data may be erased, i.e., longitudinal lines may be erased if too many erasure pixels are extracted from the starting end and the rear end.

Likewise, where data as indicated by (a) in FIG. 13 is inputted in the sub-scanning direction, image data may also be erased, i.e., lateral lines may be erased if too many erasure pixels are extracted from the starting and the rear end.

In order to prevent drawbacks as described above, minimum pixels are kept remaining in both the main scanning direction and the sub-scanning direction. The main CPU 11 sets the numbers of minimum pixels in the LUTs (or determining sections) 121 and 131.

Processing such as an interpolation calculation and the like is performed in the main scanning direction during extension processing, to realize an extension function by lowering the moving speed of the carriage. Data outputted in this time, however, has a characteristic that end portions are smooth as can be seen from FIG. 14. This characteristic changes in accordance with an extension ratio. Also, the characteristic of smooth end portions leads to fuzziness. Where outputting is carried by a multi-value printer, an image with density gradation is printed on a paper sheet and "fattening" may therefore be caused by the characteristic described above, for example, when a duplicate is copied. The "fattening" originally means that the width of a printed line on an original document is increased more and more every time printing is repeated.

In order to prevent fuzziness of end portions in extension, determination of a multi-value level is necessary. The determination can be changed depending on the extension ratio. As for the portion A shown in FIG. 14, determination is performed in consideration of preceding and successive data values, to realize a not-fattened image without fuzziness.

Figure 14:
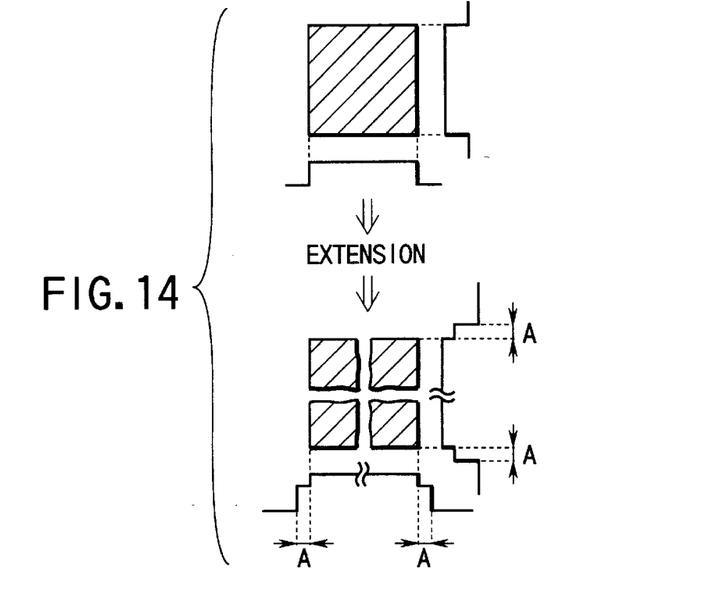
FIG. 14 explains characteristics of an end portion during extension/reduction processing section.

In this determination, those pixels which are of equal to or lower than a particular threshold value (e.g., "128" in case of 256 gradation tones of 8 bit: such a threshold value is selected that will eliminate fuzzy portion in accordance with the reproductivity of a printer) are determined as causing fuzziness and are therefore deleted.

Figure 15A:
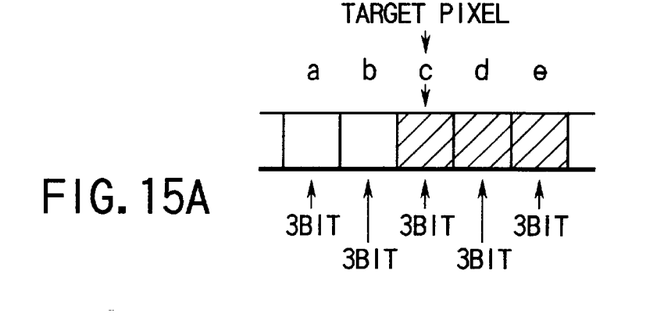
FIGS. 15A and 15B explain a determination depending on two pixels before and after a target pixel.
Figure 15B:
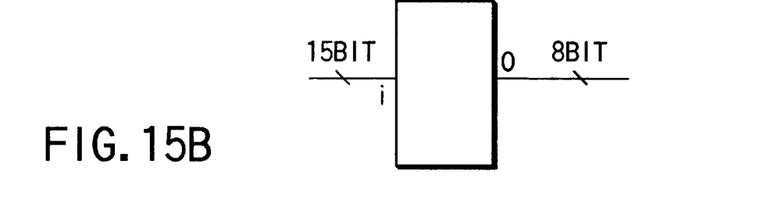

For example, in case of data shown in FIGS. 15A and 15B, every four pixels consisting of preceding two pixels and successive two pixels (a, b, d, and e) with respect to a target pixel c are determined by a LUT (Look-Up Table). In this case, the threshold value is "4"

Example 1: where a→0, b→0, c→3, d→7, and d→7 are inputted, c→0 is outputted. Example 2: where a→0, b→0, c→5, d→7, and d→7 are inputted, c→5 is outputted. ("0" is outputted if a printer cannot reproduce "5".)

Next, explanation will be made to correction processing relating to multi-bit data.

In case where correction processing is performed, a multi-bit flip-flop circuit is prepared for each of multi-bit data items in a manner as described above (in the main scanning direction). Although a method of preparing a line memory capable of responding to a multi-bit in the sub-scanning direction is available, the circuit scale is then extremely enlarged. Particularly, the determination section consisting of LUTs and the line memory sections have very large sizes.

Figure 16:
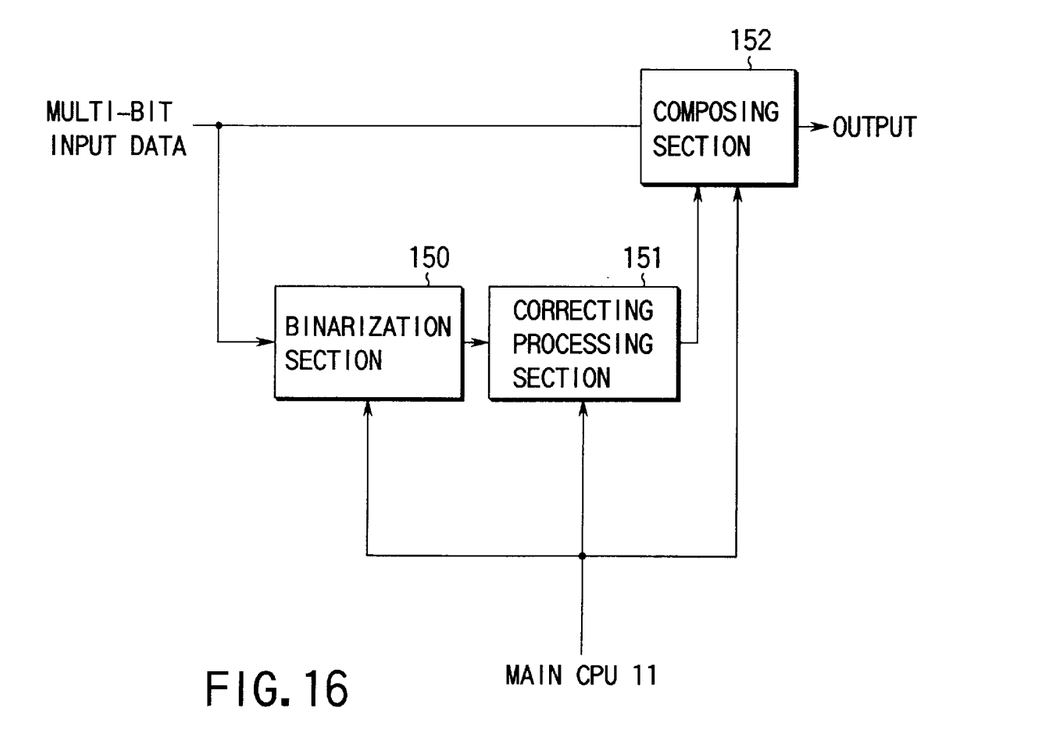
FIG. 16 shows a structure of an image processing apparatus relating to multi-bit data.

An image processing apparatus improved in this respect adopts a method as shown in FIG. 16.

Multi-bit input data is binarized by a binarization processing section 150 and a correcting process detecting section 151 performs correction processing aimed to binary data as described above. Results from the correction processing are inputted into a composing section 152 and desired processing is performed.

For example, the composing section 152 needs only to output a product of a predetermined parameter and image data. This is effective for the structures as shown in FIGS. 4 and 5.

In the above, the present invention has been explained with respect to the structures of the apparatus. Needless to say, the same effects can be expected by realizing the processing steps of the same conception in the same manner as those in the present invention. The present invention can therefore be realized also as an invention relating to a method.

As has been explained above, according to the embodiments of the present invention, two-dimensional correction can be achieved by performing the correction processing as described above, so that collapse of pixels are prevented and balance of images is not lost.

Since LUTs are used as measures for correction, it is relatively easy to make correction in compliance with a correction intensity and an output device.

The same correction can be performed on multi-bit data with a relatively simple structure.

As specifically described above, according to the present invention, it is possible to provide an image processing apparatus and an image forming apparatus, which are capable of preventing degradation of tone of an image without spoiling balance of the image and which are capable of processing an image by making excellent correction with respect to dealing with multi-bit data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus, which performs a predetermined process on image data inputted along a main scanning direction and a sub-scanning direction perpendicular to the main scanning direction, comprising:

first recognizing means for recognizing an image data of an end portion in the main scanning direction from a first predetermined number of the image data inputted along the main scanning direction;

first correction means for deleting the image of the end portion recognized by the first recognizing means;

second recognizing means for recognizing an image data of an end portion in the sub-scanning direction, from a second predetermined number of the image data inputted along the sub-scanning direction; and second correction means for deleting the image of the end portion recognized by the second recognizing means.

2. An apparatus according to claim 1, wherein the first correction means includes third correction means for converting the image into a high quality image, and for recognizing and erasing the pixels of the image from an end portion of the high quality image in the main scanning direction.

3. An apparatus according to claim 1, wherein the first correction means includes third correction means for performing extension or reduction of the image and for recognizing and erasing the pixels of the image from the end portion of the image in the main scanning direction.

4. An apparatus according to claim 1, wherein the first correction means includes third correction means for performing predetermined gradation processing with respect to a halftone area of the image and for recognizing and erasing the pixels of the image from the end portion of the image in the main scanning direction.

5. An apparatus according to claim 1, wherein the first correction means includes third correction means for converting the image into a high quality image, performing extension or reduction of the high quality image, for performing predetermined gradation processing with respect to a halftone area of the high quality image, and for recognizing and erasing the pixels of the high quality image from the end portion thereof in the main scanning direction.

6. An apparatus according to claim 1, wherein the first correction means includes third correction means for converting the image into a high quality image, and for recognizing and erasing the pixels of the image from the end portion of the high quality image in the main scanning direction, and wherein the second correction means includes an image processing means for performing extension or reduction based on the image remaining after the erasing by the second correction means, for performing desired gradation processing with respect to a halftone area of the image, and for performing predetermined image processing.

7. An apparatus according to claim 1, wherein the first correction means includes third correction means for converting the image into a high quality image, for performing extension or reduction of the high quality image, for recognizing an area of the high quality image, and for recognizing and erasing the pixels of the high quality image subjected to the extension or reduction, from an end portion thereof in the main scanning direction, and wherein the second correction means includes an image processing means for performing desired gradation processing with respect to a halftone area of the high quality image after the erasing by the third correction means.

8. An apparatus according to claim 1, wherein the first correction means includes third correction means for converting the image into a high quality image, for performing extension or reduction of the high quality image corresponding to a recognition result of an image area of the high quality image, for performing desired gradation processing with respect to a halftone area of the high quality image, and for recognizing and erasing the pixels from an end of the high quality image subjected to the gradation processing, in the main scanning direction, together with the high quality image subjected to the extension or reduction and delayed by a constant timing.

9. An apparatus according to claim 1, wherein the first correction means includes third correction means for binarizing the image and for recognizing and erasing the first predetermined pixels of the image from an end portion of the image binarized, in the main scanning direction.

10. An apparatus according to claim 1, wherein at least one of the first and second correction means includes a means for setting a predetermined number of pixels to delete from an end portion.

11. An image processing method, which performs a predetermined process on image data inputted along a main scanning direction and a sub-scanning direction perpendicular to the main scanning direction, comprising:

a first recognizing step of recognizing an image data of an end portion in the main scanning direction from a predetermined number of the image data inputted along the main scanning direction;

a first correction step of deleting the image of the end portion recognized by the first recognizing means;

a second recognizing step of recognizing an image data of an end portion in the sub-scanning direction, from the predetermined number of the image data inputted along the sub-scanning direction; and a second correction step for deleting the image of the end portion recognized by the second recognizing step.

12. A method according to claim 11, wherein the first correction step includes a third correction step of converting the image into a high quality image, and of recognizing and erasing the pixels of the image from an end portion of the high quality image in the main scanning direction.

13. A method according to claim 11, wherein the first correction step includes a third correction step of performing extension or reduction of the image and of recognizing and erasing the pixels of the image from the end portion of the image in the main scanning direction.

14. A method according to claim 11, wherein the first correction step includes a third correction step of performing predetermined gradation processing with respect to a halftone area of the image and if recognizing and erasing the pixels of the image from the end portion of the image in the main scanning direction.

15. A method according to claim 11, wherein the first correction step includes a third correction step of converting the image into a high quality image, of performing extension or reduction of the high quality image, of performing predetermined gradation processing with respect to a halftone area of the high quality image, and of recognizing and erasing the pixels of the high quality image from the end portion thereof in the main scanning direction.

16. A method according to claim 11, wherein the first correction step includes a third correction step of converting the image into a high quality image, and of recognizing and erasing the pixels of the image from the end portion of the high quality image in the main scanning direction, and wherein the second correction step includes an image processing step of performing extension or reduction based on the image remaining after the erasing in the second correction step, of performing desired gradation processing with respect to a halftone area of the image, and of performing predetermined image processing.

17. A method according to claim 11, wherein the first correction step includes a third correction step of converting the image into a high quality image, of performing extension or reduction of the high quality image, of recognizing an area of the high quality image, and of recognizing and erasing the pixels of the high quality image subjected to the extension or reduction, from an end portion thereof in the main scanning direction, and wherein the second correction step includes an image processing step of performing desired gradation processing with respect to a halftone area of the high quality image after the erasing in the third correction step.

18. A method according to claim 11, wherein the first correction step includes a third correction step of converting the image into a high quality image, of performing extension or reduction of the high quality image corresponding to a recognition result of an image area of the high quality image, of performing desired gradation processing with respect to a halftone area of the high quality image, and of recognizing and erasing the pixels from an end of the high quality image subjected to the gradation processing, in the main scanning direction, together with the high quality image subjected to the extension or reduction and delayed by a constant timing.

19. A method according to claim 11, wherein the first correction step includes a third correction step of binarizing the image and of recognizing and erasing the first predetermined pixels of the image from an end portion of the image binarized, in the first direction.

20. An apparatus according to claim 11, wherein at least one of the first and second correction steps includes a step of setting a predetermined number of pixels in an end portion.

* * * * *